United States Patent
Chaumat et al.

(10) Patent No.: US 8,590,770 B2
(45) Date of Patent: Nov. 26, 2013

(54) METHOD FOR ASSEMBLING, JOINING PARTS MADE OF SIC-BASED MATERIALS BY NON-REACTIVE BRAZING, BRAZING COMPOSITIONS, AND JOINT AND ASSEMBLY OBTAINED BY SAID METHOD

(75) Inventors: Valérie Chaumat, Saint-Paul-de-Varces (FR); Jean-François Henne, Bethune (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 13/635,343

(22) PCT Filed: Mar. 11, 2011

(86) PCT No.: PCT/EP2011/053691
§ 371 (c)(1),
(2), (4) Date: Sep. 20, 2012

(87) PCT Pub. No.: WO2011/113759
PCT Pub. Date: Sep. 22, 2011

(65) Prior Publication Data
US 2013/0011185 A1 Jan. 10, 2013

(30) Foreign Application Priority Data
Mar. 16, 2010 (FR) .................................... 10 51871

(51) Int. Cl.
*B23K 20/16* (2006.01)
*B23K 35/24* (2006.01)

(52) U.S. Cl.
USPC ..................... 228/262.2; 228/262.9; 228/903

(58) Field of Classification Search
USPC ..................... 228/262.2, 262.9, 903
See application file for complete search history.

(56) References Cited

U.S. PATENT DOCUMENTS
3,813,759 A  6/1974  Heap et al.
(Continued)

FOREIGN PATENT DOCUMENTS
WO   2005/083134 A1   9/2005

OTHER PUBLICATIONS
International Search Report issued on Jun. 14, 2011 for International Application No. PCT/EP2011/053691.
Kalogeropoulou, et al., "Relationship between Wettability and Reactivity in Fe/SiC System", Acta Metallurgica Inc., 1995, vol. 43, No. 3, pp. 907-912.
Rado, et al., "Wetting and Bonding of Ni-Si Alloys on Silicon Carbide", Acta Metallurgica Inc., 1999, vol. 47, No. 2, pp. 461-473.
(Continued)

*Primary Examiner* — Keith Walker
*Assistant Examiner* — Erin Saad
(74) *Attorney, Agent, or Firm* — Knobbe Martens, Olson & Bear, LLP

(57) ABSTRACT

A method for joining, assembling, at least two parts made of silicon carbide-based materials by non-reactive brazing is provided. According to the method, the parts are contacted with a non-reactive brazing composition, the assembly formed by the parts and the brazing composition is heated to a brazing temperature sufficient to melt the brazing composition totally or at least partly, and the parts and the brazing composition are cooled so that, after solidification of the brazing composition, a moderately refractory joint is formed; wherein the non-reactive brazing composition is a binary alloy consisting in atomic percentages, of 60% to 66% silicon and 34 to 40% nickel. A brazing composition as defined above is also provided. A paste, suspension of braze alloy comprising a powder of the brazing composition and an organic binder is provided. In addition, a joint and assembly obtained with the foregoing method is provided.

14 Claims, 2 Drawing Sheets

(56) References Cited

U.S. PATENT DOCUMENTS

| | | | |
|---|---|---|---|
| 4,990,234 | A | 2/1991 | Szczyrbowski et al. |
| 5,114,785 | A * | 5/1992 | Tenhover et al. ............. 442/127 |
| 5,447,683 | A | 9/1995 | Montgomery et al. |
| 5,975,407 | A | 11/1999 | Gasse et al. |
| 6,139,969 | A | 10/2000 | Finley |
| 7,318,547 | B2 | 1/2008 | Gasse |
| 2003/0038166 | A1 | 2/2003 | Gasse |

OTHER PUBLICATIONS

McDermind, et al., "Thermodynamic Brazing Alloy Design for Joining Silicon Carbide", Journal of the American Ceramic Society, 1991, ol. 74, No. 8, pp. 1855-1860.

Nash, et al., "The Ni-Si (Nickel-Silicon) System", Bulletin of Alloy Phase Diagrams, 1987, vol. 8, No. 1, in 1 page.

Preliminary Search Report dated Oct. 5, 2010 for French Application No. FR1051871.

* cited by examiner

METHOD FOR ASSEMBLING, JOINING PARTS MADE OF SIC-BASED MATERIALS BY NON-REACTIVE BRAZING, BRAZING COMPOSITIONS, AND JOINT AND ASSEMBLY OBTAINED BY SAID METHOD

CROSS REFERENCE TO RELATED APPLICATIONS

This application is the U.S. National Phase of International Application No. PCT/EP2011/053691, filed Mar. 11, 2011, designating the U.S. and published as WO 2011/113759 on Sep. 22, 2011 which claims the benefit of French Patent Application No. 10 51871 filed Mar. 16, 2010.

TECHNICAL FIELD

The present invention relates to a method for assembling, joining parts made of silicon carbide-based materials by non-reactive brazing with a non-reactive brazing composition, for the purpose in particular of preparing components entirely based on silicon carbide.

The assembling, joining method according to the invention is generally implemented at a temperature not exceeding 1150° C., preferably between 1020° C. and 1150° C.

The invention further relates to brazing compositions and to a joint and assembly obtained with this method, an assembly whose maximum temperature of use is generally between 850° C. and 880° C.

By <<silicon carbide-based>> materials is generally meant a material whose SiC content is equal to or higher than 50% by weight, preferably equal to or higher than 80% by weight, further preferably it is 100% by weight, in this latter case it can be said that the material consists or is composed of silicon carbide.

The silicon carbide may be in the form of fibres of silicon carbide or of a powder of silicon carbide sintered or bonded by a ceramic binder.

These silicon carbide-based materials may notably be pure silicon carbide such as pure α (α-SiC) or pure β (β-SiC) silicon carbide, substrates in silicon carbide infiltrated with silicon (SiSiC), or composite SiC-based materials such as composite materials with silicon carbide fibres and/or matrix.

The technical field of the invention can be defined as the brazing at an implementation temperature (temperature equivalent to the brazing plateau hold temperature) generally not exceeding 1150° C., preferably at a temperature of 1020° C. to 1150° C.

The assemblies concerned by the present invention are therefore generally considered to be <<moderately refractory>> i.e. the maximum temperature of use of these assemblies is generally of the order of 850° C. to 880° C.

These assemblies can enter into the production of components of complex shapes requiring good mechanical strength between the silicon carbide-based substrates and optionally a satisfactory seal either side of the joint.

BACKGROUND

It is known that it is difficult to fabricate parts of large size made of ceramic, in particular made of SiC. The tolerances after sintering the primary components in silicon carbide of large size are ill controlled and the machining of these components is unacceptable for cost-related reasons.

In addition, and for the same reasons, it is generally difficult to fabricate parts of complex shape with silicon-based compounds such as silicon carbide.

It is therefore often preferable to fabricate parts or structures of large size and/or of complex shape from elements in ceramic of simple shape and/or of small size, and then to assemble these elements to form the final structure.

Said technique is particularly necessary for fabricating structures of heat exchanger type and structural components in silicon carbide having a temperature of use possibly reaching up to 900° C. for example, even 1000° C.

On account of the high temperatures, close to 900° C. to 1000° C. for example, used in applications of ceramics such as silicon carbide, the joining of these ceramics by bonding with organic adhesives is excluded since the temperatures of use of this type of assembly cannot exceed a maximum of 200° C.

Purely mechanical assemblies, for example by stapling or screwing, only ensure partial, random contact between the parts. The assemblies thus obtained cannot be impervious. The mechanical strength is only ensured by the staples and screws, which is limited. To ensure good mechanical strength of the joint, it is essential to create good adhesion between the parts to be joined, which is not possible with screws or staples.

Additionally, conventional joining techniques by welding having recourse to an energy beam with or without a filler metal (TIG, electron or laser welding) and involving the partial melting of the parts to be joined cannot be used for assembling ceramics since it is not possible to melt a substrate or a part in ceramic, and in particular since silicon carbide decomposes before melting.

Usual techniques for obtaining refractory assemblies of ceramics are solid phase diffusion bonding and joining by sintering or co-sintering.

For assembly by diffusion bonding, a pressure is applied at high temperature between the interfaces to allow atomic inter-diffusion between the two substrates. The temperature must always remain lower than the melting point of the least refractory material, and there is therefore no liquid phase in the system. This type of joining is obtained either under a press in single direction, or in an isostatic chamber. Diffusion bonding is well adapted for the joining of two metal alloys and very little adapted for the joining of ceramic materials, since the atoms forming the ceramic scarcely diffuse at the joint. In addition, the method is prohibitive from a mechanical viewpoint since it requires placing under compression porous, fragile substrates and materials such as silicon carbide composites which risk being highly damaged under this mechanical compressive loading.

The joining by sintering or co-sintering of parts made of SiC also requires high pressures but in addition high temperatures and long hold times since this process is based on the principle of inter-diffusion between the SiC elements.

In other words, solid phase diffusion bonding and joining by sintering have the disadvantage of being restrictive from an implementation standpoint since:

for solid phase diffusion bonding, the shape of the parts must remain simple if uniaxial pressing is used, or else it requires complex tooling and preparation for example entailing the fabrication of a jacket, vacuum sealing, hot isostatic pressing, final machining of the jacket if HIP is used (Hot Isostatic Pressing).

for co-sintering or joining by sintering the problems remain the same (shape of the parts, complex implementation) with, in addition, the need to control the sintering of a filler powder to be inserted between the two materials to be joined.

these two techniques additionally require the use of long hold times (one to several hours) at high temperature since the processes used have recourse to solid state diffusion.

It follows from the above, and to summarize, that in order to guarantee good mechanical strength in particular and optionally satisfactory sealing of the assembly, only those processes using a liquid phase such as brazing can be envisaged.

Brazing is a low-cost technique, easy to perform and is the most commonly used. Parts of complex shape can be prepared using brazing, and brazing operations are limited to placing between the parts to be joined, or in the vicinity of the joint between the two parts, a filler alloy called a braze alloy and melting this alloy which is capable of wetting and spreading over the interfaces to be joined, filling the joint between the parts. After cooling the brazing alloy solidifies ensuring the cohesion of the assembly.

Most brazing compositions for parts in silicon carbide-based materials are insufficiently refractory. These are generally brazing compositions formed by metal alloys having a melting point that is lower even much lower than 1000° C. Said melting temperature is distinctly insufficient for applications at temperatures in the region of 800° C. or 900° C., for example from 850° C. to 880° C.

Also, most chemical elements which form part of these metal brazing compositions are highly reactive with silicon carbide on and after 500° C. and lead to fragile compounds.

As a result, for brazing at higher temperatures generally above 1000° C., said brazing compositions or braze alloys would chemically attack the silicon carbide-based materials not only during the brazing operation but also during functional use by solid state diffusion.

It is also pointed out that the least reactive alloys are also the least refractory, such as the AgCuTi alloy for example with Ag—Cu matrix, and active Ti element in low concentration. For the applications more particularly concerned by the invention, which are those of moderately refractory assemblies having a temperature of use of generally up to 850° C., even 880° C., all the reactive brazing compositions chiefly containing silver, or silver-copper, copper, nickel, iron or cobalt, platinum, palladium or gold are therefore to be excluded on account of their strong reactivity with silicon carbide.

Formulations of brazing alloys, brazing compositions, that are more refractory and with high silicon content are presented in documents [1, 2, 3]. These brazing compositions have scarcely reactive behaviour, even non-reactive, with SiC which prevents the formation of fragile compounds. This criterion of non-reactivity or very low reactivity is not a sufficient condition however for guaranteeing good mechanical strength of the brazed joints. In the literature, the yield strength values of binary silicon-based brazing alloys are most variable in relation to the second element taking part in the silicon-based non-reactive brazing composition.

For example, for the non-reactive Fe—Si system (45% Fe-55% Si by weight), document [3] mentions an extremely low ultimate tensile strength of the order of 2 MPa, despite the non-reactivity of this composition indicated in document [4], whilst for the Cr—Si system (25% Cr-75% Si by weight), this same document [3] gives a higher value of the order of 12 MPa.

For a non-reactive Co—Si alloy (90% Si-10% Co by weight), document [1] mentions a value of about 100 MPa under compression/shear.

The properties, in particular mechanical properties, of a silicon-based brazing composition are fully unpredictable and can absolutely not be inferred from the mechanical properties of already known Si-based brazing compositions, even if of very close type.

In other words, when it is sought to prepare a silicon-based brazing composition in particular for brazing parts in SiC, it is absolutely not possible to refer to the mechanical properties which may be acceptable exhibited by other known Si-based brazing compositions, since any modification however small of a Si-based brazing composition whether concerning the type of the metal(s) brazed with the silicon or the proportions thereof, may lead to unpredictable, unexpected even major changes in the properties of the composition and in particular its mechanical properties.

To conclude, it is not possible to predict the mechanics of a given binary Si—X system where X is a metal, and even less so the mechanics of a said system as a function of the proportions of X.

The brazing temperatures of the brazing compositions in documents [1, 2] and [3] are generally higher than 1300° C. These brazing temperature are for example 1355° C. for the Ti—Si composition (22-78% by weight), 1355° C. for the Cr—Si composition (25-75% by weight), 1400° C. to 1450° C. for the Co—Si composition, and 1750° C. for the $Ru_2Si_3$ composition.

The efficacy of this joining method requires brazing temperatures higher than 1300° C. for thermodynamic destabilization of the passivating silicon oxide layers which occur spontaneously on the silicon carbide surfaces, since these silicon oxide layers are detrimental to wetting by the brazing composition, even if brazing is conducted in a vacuum.

Therefore the above-mentioned brazing alloys with high silicon content and used at a temperature higher than 1300° C. are not suitable for the brazing of substrates in silicon carbide-based materials whose properties are degraded after exposure to 1300° C., even more so for those which degrade at 1150° C., even 1100° C. or lower. This is notably the case with some SiC/SiC composites which degrade at above 1300° C., even 1150° C., and even at above 1100° C. For example, the CMC examined below degrades beyond 1100° C.

It is true that document [3] in Example 2 presents a Ni—Si brazing composition (65%:35% by weight, i.e. 47% Ni:53% Si in atomic %) which can be brazed at 1120° C., for 16 hours. This brazing temperature is slightly higher than the preferred brazing temperature used in the invention which is 1100° C., but it uses a very long brazing hold time. However, the mechanical strength of the joint obtained with this composition (ultimate tensile strength of 375 p.s.i.—i.e. about 2.6 MPa) is very low despite the non-reactivity of this composition mentioned in document [5]. This mechanical strength is insufficient for numerous applications and in particular the main applications concerned herein, despite the low reactivity of this brazing composition with SiC.

In document [5], it is specified that in studies prior to this document it had been shown that the concentration of Si in Nickel in equilibrium with graphite at 1633 K is 37±3 atomic %, and that it could consequently be expected that Ni—Si alloys with silicon contents higher than this value would not display any reactivity with SiC at 1633 K.

In this document, Ni—Si alloys are prepared with Si concentrations of 40, 50, 67 and 85 atomic % and it is shown during wetting studies that, for silicon contents higher than 40 atomic %, the SiC/Ni—Si interface is not reactive, but no mechanical data on these alloys is provided.

The work described in document [5] focuses on the study of wetting angles and the work of adhesion (thermodynamic adhesion at a solid/liquid interface, this adhesion is defined by the work needed for reversible separation of a solid/liquid interface into two solid/vapour and liquid/vapour surfaces.

In this document, there is no joining obtained by brazing parts in silicon carbide using the prepared Ni—Si alloys as brazing composition, and no indication is given regarding the possible mechanical properties of these assemblies.

Finally, it is noted that for these Ni—Si brazing alloys, the range between liquidus and solidus is very extensive with, as already mentioned above, the onset of melting on and after 966° C. (for Ni 66% by weight, and in fact for the range with at least 40 atomic % silicon since there are even 2 eutectics based on the Ni—Si phase diagram in document [5], one at 966° C. and one at 964° C.) which limits application temperatures to below 900° C.

For example, for the 30 Ni-70 Si (weight %) composition or 17 Ni-83 Si(atomic %) composition, melting starts at 966° C. and the alloy is fully liquid at 1320° C., which requires brazing at around 1350° C., which is largely above the preferred limit temperature targeted herein.

Document [6] mentions a ternary brazing alloy Ni-13.4 Cr-40 Si (atomic %) whose melting point is 1150° C. and which is used at a brazing temperature of 1200° C. The authors did not conduct mechanical characterization on the brazed joints and only metallurgical characteristics are given which indicate non-reactivity.

No mechanical test result on this alloy is provided which means that good mechanical strength of the brazing can in no way be guaranteed.

Document [2] proposes (Example 3) a Pt—Si alloy which is brazed at 1200° C. The Pt content of this brazing composition is very high (77 weight % Pt), which leads to a very costly process. This disadvantage is prohibitive for the obtaining of large-size brazed parts.

Finally document [7] presents brazing alloys having a Si content of less than 50 weight %, preferably 10 to 45 weight %, and with the addition of at least 2 elements chosen from the following group: Li, Be, B, Na, Mg, P, Sc, Ti, V, Cr, Mn, Fe, Co, Zn, Ga, Ge, As, Rb, Y, Sb, Te, Cs, Pr, Nd, Ta, W and Ti. In this group of elements at least one thereof is preferably a metal chosen from among Fe, Cr, Co, V, Zn, Ti and Y. Nickel is not cited.

The examples in document [7] describe ternary brazing compositions: Si—Cr—Co (11:38.5:50.5% by weight); Si—Cr—Co (40:26:34% by weight); Si—Fe—Cr (17.2:17.5:65.3% by weight); and Si—Fe—Co (20:20:60% by weight); and the brazing thereof at temperatures respectively of 1230° C., 1235° C., 1460° C. and 1500° C.

The brazing compositions in document [7] never contain the nickel element.

Regarding the brazing compositions having brazing temperatures lower than 1300° C., it is simply mentioned that a <<strong>> bond is obtained and no mechanical test is provided to prove that good mechanical strength of the joints is effectively obtained. Also the low reactivity of the SiC/brazing filler is neither mentioned nor referred to.

In the light of the foregoing there is therefore a need, not yet met, for a method with which it is possible to obtain the joining by brazing of parts in silicon carbide-based materials, more specifically of moderately refractory substrates in silicon carbide, which ensures satisfactory mechanical strength of the assembly at between 20° C. and 850° C. even 880° C., in particular above 500° C. and up to 850° C. even 880° C., and optionally also sealing of the joint.

This method must allow the use in particular of brazing temperatures equal to or lower than 1150° C. and preferably of 1100° C. which is a temperature that it is essential not to exceed for some SiC-based substrates, parts to be assembled.

It is effectively essential that the parts, substrates maintain their full integrity and initial performance levels after the joining operation by brazing.

There is therefore a need for a brazing method using brazing compositions which allows the desired temperatures of use to be reached namely up to 850° C. even 880° C., whilst avoiding the subjecting of the parts, substrates in silicon carbide-based materials to temperature ranges which could deteriorate these materials.

In other words, there is a need for a brazing method which allows moderately refractory brazed joints to be obtained (with a temperature of use of up to about 850° C. even 880° C.) using brazing cycles generally not exceeding a limit temperature defined between 1020° C. and 1150° C., in particular of 1100° C. depending on the SiC-based material to be joined.

Numerous silicon carbide-based materials, in particular some composites, are irreversibly deteriorated over and above 1100° C.: this is particularly the case with some composites formed of a SiC matrix and SiC fibres such as a composite available from SNECMA Propulsion Solide under the trade name Cerasep A40C®.

In addition, the holding time of the brazing plateau at a temperature equal to or lower than 1150° C., for example of 1100° C., must preferably be from one or few minutes to two or three hours at most to avoid degradation of the composite.

On the other hand, pure silicon carbide withstands brazing at 1450° C.

In other words, there is a need for a brazing method and composition, brazing alloy, firstly allowing the use of the full refractory potential of the silicon carbide-based substrates at temperatures of use of up to about 850° C. even 880° C., and secondly allowing brazing at a brazing temperature lower than the degradation temperature of the substrates with a brazing temperature equal to or lower than 1150° C., preferably in the range between 1020° C. and 1150° C., more preferably lower than 1100° C., further preferably in the range between 1080° C. and 1100° C.

There is also a need for a method allowing brazing to be conducted at a temperature equal to or lower than 1150° C., preferably between 1020° C. and 1150° C., of a moderately refractory assembly (temperature of use generally between 850° C. and 880° C.), of parts made of silicon carbide-based materials irrespective of their shape and/or their size.

In particular, there is a need for a brazing method and for the associated brazing composition, allowing the brazing to be conducted at a temperature lower than 1150° C., preferably between 1020° C. and 1150° C., of silicon carbide-based parts of large size and/or of complex geometry notably having large surface areas to be brazed.

In addition, none of the methods and compositions in the prior art simultaneously meets the following criteria evidenced by the inventors which are fundamental for preparing structural components in SiC entailing moderately refractory joints:

1) the brazing composition must allow a strong bond to be obtained between the two parts in silicon carbide-based material, which necessitates a non-reactive brazing composition i.e. chemically compatible with silicon carbide, and which does not form fragile compounds therewith. However, the non-reactivity does not guarantee the forming of a strong bond since it remains unpredictable. Non-reactivity is a condition for obtaining a strong bond but it is not sufficient. For example, the Fe—Si system cited in the literature [3] is non-reactive but its mechanical strength is very weak;

2) the brazing composition must obtain good wetting of the silicon carbide and good adhesion thereto. This very good wetting is essential for the quality of the joints since it notably ensures good filling quality of the joint, but it does not allow guaranteed good mechanical behaviour since this latter property is unpredictable;

3) the brazing composition must be compatible with all heating devices in particular rapid and/or localised heating devices;

4) the brazing composition must allow the formation of joints having good mechanical strength;

5) the brazing composition must be formed of a limited number of elements to facilitate the preparation and implementation thereof;

6) the brazing composition must not contain costly elements such as precious metals.

Finally, the method and associated brazing composition must allow the brazing, the joining of any type of silicon carbide-based material, and must be easily adaptable to any specific silicon carbon-based ceramic.

The objective of the invention is therefore to provide a method for the joining by brazing of parts or components made of silicon carbon-based materials which inter alia meets the above-cited needs, which inter alia fulfils all the requirements and criteria set forth above, which eliminates the disadvantages, defects, limitations encountered with prior art methods and which solves the problems of the prior art methods.

The objective of the invention is notably to provide a method for the joining by brazing of parts or components made of silicon carbide-based materials which allows satisfactory mechanical strength of the assembly to be obtained above 500° C. and up to 850° C., even 880° C., which uses brazing temperatures equal to or lower than 1150° C., preferably in the range between 1020° C. and 1150° C., and more preferably equal to or lower than 1100° C., for example from 1080° C. to 1100° C., and which optionally allows the obtaining of joints having an excellent seal.

DISCLOSURE OF CERTAIN INVENTIVE ASPECTS

This objective and others are achieved according to the invention by a method for joining, assembling, at least two parts made of silicon carbide-based materials by non-reactive brazing, in which the parts are contacted with a non-reactive brazing composition, the assembly formed by the parts and the brazing composition is heated to a brazing temperature sufficient to melt the brazing composition totally or at least partly, and the parts and the brazing composition are cooled so that, after solidification of the brazing composition, a moderately refractory joint is formed; wherein the non-reactive brazing composition is a binary alloy consisting (composed) in atomic percentages, of 60% to 66% silicon, and 34% to 40% nickel.

The melting of the brazing composition is generally considered to be complete, total when it is in the liquid state at a temperature equal to or higher than the liquidus. The melting of the brazing composition is generally considered to be partial when it is in a state that can be qualified as semi-solid, viscous, softened, at a temperature lying between the solidus and the liquidus.

In general, brazing is conducted at a brazing temperature equal to or lower than 1150° C., preferably the brazing temperature is 1020° C. to 1150° C., more preferably from 1080° C. to 1100° C.

By moderately refractory joint is generally meant that this joint is generally capable of withstanding operating, use, temperatures of up to 850° C. even 880° C.

The method of the invention, which is a brazing method at a temperature equal to or lower than 1150° C., preferably from 1020° C. to 1150° C., more preferably from 1080° C. to 1100° C. and using a specific brazing composition, has never been described in the prior art.

In particular, the specific brazing composition used according to the invention which surprisingly at a temperature equal to or lower than 1150° C., preferably from 1020° C. to 1150° C., more preferably from 1080° C. to 1100° C., allows the brazing of parts made of silicon carbide-based materials is in no way mentioned in the above-cited prior art documents.

For example, document [7] does not mention nickel in the list of 27 elements among which at least two must be chosen to form a brazing composition with silicon, silicon at all times being present to a proportion of less than 50% by weight. In this list Fe, Cr, Co, V, Zn, Ti and Y are preferred and nickel for all the more reason is not cited among the preferred elements.

None of the particularly preferred brazing alloys in this document which are alloys of silicon, chromium and cobalt, alloys of silicon, chromium and iron, alloys of silicon, iron and cobalt, and none of the brazing compositions exemplified in this document contains nickel.

In addition, the alloys described in this document are much more complex than the binary Si—Ni alloy used in the invention. The brazing alloys in this document are at least polyconstituent ternary alloys whose preparation and controlling of properties are much more difficult than those of binary alloys.

The brazing compositions of the examples provided in document [7] are limited to the ternary systems SiFeCo, SiFeCr, SiCrCo with a Si content of less than 40% by weight. These compositions do not contain nickel and globally have a much reduced number of elements compared with the list of 27 possible addition elements. It is also to be added that the brazing compositions of the invention have silicon concentrations of more than 45 weight % i.e. a higher Si concentration than those indicated in document [7].

Document [7] does not contain any indication able to lead to the preparation of a binary brazing alloy, since it concerns alloys containing at least three elements. Also, document [7] does not contain any indication possibly leading to the choice of nickel and even less so to a specific content thereof for preparing a binary brazing alloy compatible with SiC, and which ensures the brazing at a temperature of 1020° C. to 1150° C., preferably from 1080° C. to 1100° C., of SiC-based parts and effective joining of these parts.

In document [5], the wetting of SiC is examined with pure nickel, pure silicon and alloys comprising 40, 50, 67 and 85 atomic % of silicon. As already pointed out above, no brazing operation is carried out with these alloys and this document does not provide any data on the possible mechanical strength of assemblies which could be prepared with these alloys.

Only data on the non-reactivity and good wetting of SiC by alloys having Si contents of more than 40 atomic % are disclosed. A seen above, good wetting properties and/or the non-reactivity of an alloy cannot in any way guarantee the good mechanical behaviour of this alloy when it is used for joining parts in SiC, or the good mechanical properties of this assembly.

The method of the invention fulfils the needs, meets all the requirements and criteria mentioned above and does not have the disadvantages of the prior art methods.

In particular, for the first time, the method of the invention allows the preparation of moderately refractory assemblies i.e. having a temperature of use of up to 850° C., even 880° C., of parts made of silicon carbide-based materials irrespective of their geometry, even very complex, and/or their size.

The method of the invention in all cases particularly ensures good filling of the joint with the brazing composition and, in fully surprising manner, ensures excellent mechanical strength of the assembly at ambient and hot temperature in particular above 500° C. and up to 850° C.-880° C., and optionally very good imperviousness, leak tightness of the joint.

The method of the invention is additionally simple, reliable, easy to implement and overall of low cost.

In other words, the multiple advantages and surprising effects of the invention can be enumerated as follows, this enumeration not to be construed as limiting:

- in relation to the composition of the chosen brazing composition, several brazing temperatures are possible between 1020° C. and 1150° C. and are therefore able to meet different specifications;
- the assembly obtained with the invention allows the guaranteed good mechanical adhesion between the silicon carbide substrates even at maximum temperatures of use of over 500° C. and possibly reaching 850° C. for example, even 880° C. Breaking rupture occurs in "cohesive" mode i.e. cracks occur in the silicon carbide substrates and not at the brazed joint;
- the brazing temperature is equal to or lower than 1150° C., preferably from 1020° C. to 1150° C., and more preferably from 1080 to 1100° C., it is therefore possible with the method of the invention to join silicon carbide-based parts, substrates which cannot withstand temperatures of more than 1150° C., such as composite parts, substrates with ceramic matrix such as Cerasep A40C®. In other words, with the method of the invention it is possible obtain the brazing of SiC-based parts which degrade on and after 1150° C., even 1100° C. Evidently the method of the invention applies to pure or near-pure SiC, for example sintered SiC (in general sintered SiC contains sintering additives and is therefore not perfectly pure) for which brazing temperatures higher than 1300° C. can be used, but it also applies to less stable materials using brazing compositions adapted to these less heat-stable materials;
- surprisingly, despite the brazing temperature equal to or lower than 1150° C., preferably from 1020° C. to 1150° C., more preferably from 1080 to 1100° C., used in the method of the invention, excellent wetting of the brazing composition, of the brazing alloy of the invention on the surfaces of the substrates, parts in silicon carbide to be assembled has been ascertained. Therefore by means of this good wetting of the surfaces, it is possible according to the invention to conduct capillary brazing since the brazing composition of the invention is capable alone of filling the joint between the parts during the brazing operation for joints of a few microns to a few tens of microns, but also for thicker joints whose thickness may reach 500 μm;
- non-reactivity of the brazing alloy on the silicon carbide-based substrates was observed on the scale of scanning electron microscopy. There are no complex, porous weakening zones at the interface;
- the brazing obtained with the method of the invention is reversible. It is therefore possible to disjoin, separate the assembled parts, substrates for example for the repair thereof by melting the brazing alloy in a furnace during a second melting operation of this brazing alloy, without deteriorating the parts, substrates. The parts, substrates can also be separated by chemical attack. In other words, the method of the invention allows the repair of joined parts in silicon carbide material. This means that these parts can be subjected to a second brazing cycle if need be for the purpose of repair without deteriorating the properties of the joints. This capacity for repair is possible due to the non-reactivity or scarce reactivity of the brazing alloys used in the invention with silicon carbide;
- another remarkable property obtained with the method of the invention is the homogeneity of the joint obtained after brazing and the very good mechanical behaviour of the joints formed;
- it is not necessary in the method of the invention to metallize the parts, substrates in SiC materials with the brazing composition before the brazing operation at a temperature equal to or lower than 1150° C., since the joints are well filled with the brazing composition of the invention, even in capillary configuration;
- it is further not necessary in the method of the invention to deposit carbon on the parts, substrates in SiC materials before the brazing operation at a temperature in particular lower than 1150° C. The wetting kinematics are rapid and there is a good wetting angle.

For example, on a Cerasep A40C® SiC/SiC composite, the angle is of the order of 40° after a hold time of 5 minutes at 1100° C., and of the order of 30° after a hold time of 30 minutes; and on sintered SiC it is of the order of 60° after a hold time of 5 minutes at 1100° C. and less than 40° after 30 minutes (cf. Examples 1 and 2). The joints are well filled with the brazing composition of the invention, even in capillary configuration.

- the brazing compositions of the invention do not contain any precious chemical element, in particular no metals from the platinum or rhodium family, which limits their cost and the cost of the method in which they are used compared with numerous prior art compositions;
- the brazed joints obtained with the method of the invention are generally impervious. The method of the invention is therefore adapted for sealing operations which must withstand maximum temperatures of between 850° C. and 880° C. depending on the braze alloy composition.

As already mentioned above, the behaviour of the brazing compositions, more particularly for brazing SiC, is extremely unpredictable and cannot under any circumstance be inferred from the behaviour of like brazing compositions.

Advantageously, the brazing composition of the invention is a binary alloy consisting (composed), in atomic percentages, of 63% to 65% silicon and from 35% to 37% nickel.

The preferred composition of the invention consists in atomic percentages, of 64% silicon and 36% Ni, i.e. in mass percent 54% Ni and 46% Si.

This preferred composition has a solidus temperature of 966° C. and a liquidus temperature of 1070° C.

The different brazing compositions defined by the advantageous percentages specified above are neither described nor suggested in the prior art.

Advantageously in the method of the invention it is possible to form a brazing composition powder, to place this powder in suspension in an organic binder so as to obtain a suspension or paste of brazing composition, and to deposit the suspension or paste of brazing composition obtained on at least one surface of at least one of the parts to be assembled, joined.

For example, it is possible to coat one surface to be joined of at least one of the parts to be assembled, joined, with the suspension or paste of brazing composition, then to place in contact the surfaces to be joined, assembled, of the parts so that the suspension or paste of brazing composition is inserted between these surfaces.

Or else it is possible to place in contact the surfaces to be joined, assembled, of the parts to be assembled, joined, by leaving an offset between them so as to create a free surface able to receive the suspension or paste of brazing composition in the vicinity of the joint formed by the surfaces to be joined, assembled, of the parts to be assembled, joined, then the suspension or paste of brazing composition may be deposited on this free surface for example in the form of a bead.

Prior to contacting with the brazing composition, the depositing of carbon on at least one of the surfaces of the parts to be assembled is not necessary.

This is precisely another advantage of the method according to the invention in that this carbon deposit can be omitted, thereby avoiding an additional step in the brazing method.

Advantageously, the brazing can be conducted at a brazing temperature that is at least 15° C. higher, preferably at least 30° C. higher than the melting point of the brazing composition.

For the brazing of porous brazing surfaces, for example for composite materials whose SiC surface coating is insufficiently thick, it may be useful to conduct brazing at a temperature between the liquidus and the solidus of the brazing composition to obtain a braze filler in the semi-solid state during the brazing (temperature) plateau. The braze composition is then viscous and the infiltration thereof into the porosities can be better controlled.

Advantageously, brazing can be performed by conducting a brazing plateau at a brazing temperature of 1020° C. to 1150° C., preferably 1080° C. to 1100° C., held for a time of 1 to 150 minutes, preferably 30 to 150 minutes, more preferably 60 to 120 minutes, further preferably 90 to 120 minutes.

If at least one surface to be joined of the parts to be assembled, joined, is porous, a brazing temperature plateau at 1020° C. to 1080° C. held for a time of 1 to 30 minutes can be applied.

In other words, for materials having relatively porous brazing surfaces, such as composite materials whose SiC coating is of insufficient thickness, it may be useful to reduce the usual brazing time which is generally of the order of 30 to 150 minutes, to a time of a few minutes namely a time of between 1 and 30 minutes for example, to avoid too much infiltration of the braze alloy into the porosities of the material to the detriment of joint filling.

In this case, it also noted that the lowest brazing temperatures are generally recommended to limit infiltration, namely generally of between 1000° C. or 1020° C. and 1080° C.

Advantageously, prior to the brazing temperature plateau, it is possible to observe a first plateau at a temperature generally of 850° C. to 910° C. e.g. 900° C., held for a time of 30 to 180 minutes, preferably 60 to 180 minutes, more preferably 90 to 180 minutes, for example 120 minutes.

Advantageously, the silicon carbide-based materials can be chosen from among pure silicon carbides such as pure α silicon carbide (α-SiC) or pure β silicon carbide (β-SiC), and SiC-based composite materials such as composites with silicon carbide fibres and/or matrix.

More particularly, the silicon carbide materials may be chosen from among pressureless sintered silicon carbide ("PLS-SiC"); Si-infiltrated silicon carbide ("SiSiC" or "RBSC"); porous recrystallized silicon carbide ("RSiC"); graphite silicon ("C—SiC") composed of graphite coated with a SiC layer; SiC/SiC composites, for example with fibres or whiskers; SiC/SiC composites with self-healing matrix; C/SiC composites, for example with carbon fibres or whiskers and SiC matrix; SiC monocrystals; SiC composites with another ceramic for example $SiC/Si_3N_4$ and SiC/TiN composites.

In general, the said silicon carbide-based materials have a silicon carbide content of at least 50% by mass, preferably at least 80% by mass and more preferably 100% by mass.

The invention also concerns the brazing compositions described above in the description of the method according to the invention.

The invention also pertains to a brazing paste, suspension for the brazing, for example the non-reactive, moderately refractory brazing of parts made of silicon carbide-based materials, comprising a powder of a brazing composition according to the invention such as defined above, and an organic liquid cement, binder, or an organic viscous gel.

The invention also concerns the moderately refractory joint (maximum temperature of use generally of between 850° C. and 880° C.), and the assembly comprising at least two parts made of SiC-based materials obtained using the method of the invention described above.

Other characteristics and advantages of the invention will become better apparent on reading the following description given as a non-limiting illustration and with reference to the appended drawings in which:

DETAILED DESCRIPTION OF CERTAIN ILLUSTRATIVE EMBODIMENTS

Figure 1:
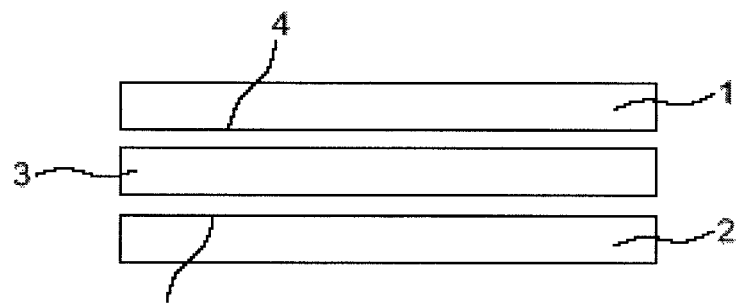
FIG. 1 is a schematic view showing the arrangement of the plates of SiC-based material and of the paste of brazing composition for brazing in <<sandwich>> configuration.

The first step of the method according to the invention generally consists of preparing, forming a brazing composition, in other words a braze alloy containing silicon and nickel.

The braze alloy of the invention is a binary Silicon (Si)-Nickel (Ni) alloy.

The melting point of the braze alloy of the invention is generally between 966° C. (solidus=eutectic, onset of melting common to all compositions of the mixture) and 1125° C. (liquidus of the composition with the highest silicon content), the preferred composition has a liquidus temperature of 1070° C. The predominant element of the alloy is silicon.

The mass proportions of the binary Si—Ni alloy in atomic percentages are 60% to 66% silicon and 34% to 40% nickel.

Advantageous proportions, and particularly advantageous or preferred proportions were indicated in the foregoing.

The brazing composition is generally a powder composition which can be prepared for example by first synthesizing, from pure Si and Ni elements, an intermetallic compound containing silicon and nickel.

The synthesis of the said intermetallic compound is obtained for example by adding silicon (for example in the form of pieces), nickel (for example in the form of pieces or other form), in the desired proportions for the brazing composition in a refractory crucible made of alumina for example.

The assembly formed by the crucible, silicon and nickel is placed in heating apparatus such as a graphite furnace or metal furnace and is heated to a temperature generally of 1200° C. to 1300° C., for example 1250° C., preferably under argon, for a time of 60 to 120 minutes, for example 120 minutes, to melt the different constituents of the brazing composition and to obtain, after cooling, the final desired intermetallic compound that is homogeneous and in ingot form. The heating temperature is preferably 1250° C. for the preferred composition of the invention.

The fabrication of the ingot can also be done in a cold crucible.

This contactless melt technique (copper crucible cooled by circulating water and placed in an inductor) allows the alloy to be melted without contacting the crucible and hence the recovery thereof without machining the crucible.

The ingot of intermetallic compound obtained is then ground using any suitable apparatus for example in a mortar to obtain a powder of adequate particle size, i.e. whose particles have a diameter of 1 to 300 µm for example, and which constitutes the brazing composition.

Or else, the binary brazing composition of the invention can be prepared for example by weighing pure silicon powder and a powder of the intermetallic $NiSi_2$ and/or NiSi compound in the chosen proportions for the brazing composition of the invention, and then blending these powders in a <<Turbula>> for at least 30 minutes.

The powder composed of the mixture of powders of intermetallic compound and Si, in this case, forms the brazing composition.

The said $NiSi_2$ or NiSi intermetallic compound can be synthesized, or it can be purchased in the form of a powder of intermetallic compound of known particle size and purity.

The pure silicon powder can be prepared from pieces of pure silicon ground in any suitable apparatus for example a mortar to obtain a powder of suitable particle size, the diameter of the grains being from 1 to 250 µm for example.

Instead of being thus prepared, the said pure silicon powder can also be a commercial powder of known particle size and purity. Among these commercial powders mentioned can be made for example of: pure Si powder marketed under the trade name CERAC®, having purity of 99.5% or 99.99% and a particle size of the order of 50 µm.

The brazing composition powder (Si and Ni) is placed in suspension as is conventional in a binder, cement, organic liquid gel, preferably both viscous and tacky, to obtain a paste, suspension of brazing composition allowing homogenous coating on the surfaces of the parts, substrates made of silicon carbide-based material to be brazed.

The binder, cement, gel generally decomposes at between 100 and 300° C. for example without leaving any trace. It may be cement for example of type NICROBRAZ® or a gel (VITTA® gel).

The second step of the method of the invention generally consists of forming the assembly by actual brazing.

Prior to assembling, joining, the two (or more) surfaces of the parts in SiC materials to be assembled are generally degreased, cleaned in an organic solvent for example of ketone, ester, ether, alcohol type, or a mixture thereof, etc.

One preferred solvent is acetone or an acetone-ethyl alcohol-ether mixture for example in proportions of 1:3, 1:3, 1:3; it is also possible to clean the parts successively with several different solvents, for example with acetone followed by ethanol. The parts are then dried.

The parts made of SiC-based materials to be assembled are generally two in number, but it is also possible simultaneously to join a larger number of parts of possibly up to 100.

By part made of SiC-based material is generally meant any element or entity of any shape and size which, after assembly with one or more other parts, enters into structures of larger size.

According to the invention it is possible, each time with excellent results, to join parts of complex geometry, shape, and/or of large size for example having a surface area of 0.5 $m^2$ or more to be brazed.

By silicon carbide-based material is generally meant herein any materials containing at least 50% by mass of silicon carbide, preferably at least 80% by mass of silicon carbide, further preferably 100% by mass of silicon carbide; in this latter case, the material consists or is composed solely of silicon carbide.

The silicon carbide-based materials may notably be in the form of a sintered or infiltrated powder or of fibres bound by a ceramic matrix.

The silicon carbide-based materials may be chosen from among pure silicon carbides such as pure α silicon carbide (α-SiC) or pure β silicon carbide (β-SiC) and SiC-based composite materials such as composites with silicon carbide fibres and/or matrix.

As examples of SiC-based materials, mention may be made of pure dense silicon carbide or pressureless sintered silicon carbide (PLS-SiC); Si infiltrated silicon carbide (Si-SiC or RBSC containing 5 to 20% Si); porous recrystallized silicon carbide (RSiC); graphite silicon (C—SiC) formed of graphite coated with a layer of SiC for example to a thickness of 0.1 to 1 mm; and SiC/SiC composites, for example with fibres or whiskers; SiC/SiC composites with self-healing matrix; C/SiC composites, for example with carbon fibres or whiskers and SiC matrix; and also SiC monocrystals; SiC composites with another ceramic, for example $SiC/Si_3N_4$ and SiC/TiN composites.

Preferably, the silicon-based material of the substrates, parts to be joined according to the invention is composed of 100% silicon carbide chosen for example from among sintered pure α (α-SiC) or pure β (β-sic) silicon carbide or from among composites with silicon carbide fibres and silicon carbide matrix.

It has surprisingly been ascertained that the method of the invention allows the brazing of composites with excellent results.

The two or more parts to be joined may be made of one same silicon carbide-based material for example in PLS (<<Pressureless Sintered>>)-SiC, or of a SiC—SiC composite, or each of the parts may be in a different silicon carbide-based material.

The suspension, paste of the brazing composition prepared as described previously is spread, coated, applied homogeneously, uniformly using a brush or spatula for example or a syringe optionally fixed to a robotized system, or using any other means allowing a uniform layer of brazing paste to be deposited on the surface of at least one of the parts in silicon carbide-based material to be joined, assembled.

The paste-coated surface(s) of the two parts (1, 2) to be joined, assembled, are then placed in contact. This brazing configuration illustrated in FIG. 1 is called a <<sandwich configuration>> since the paste of brazing composition (3) is placed directly between the surfaces (4, 5) of the parts to be joined, assembled.

Preferably in this <<sandwich>> configuration it is recommended, for the brazing composition of the invention, that the brazing paste should not be uniformly distributed but applied in the form of beads of braze alloy (brazing beads) which do not touch each other to avoid a configuration that is too confined.

The quantity of paste, suspension of brazing composition to be used in this configuration is generally 10 mg/cm² to 60 mg/cm², for example 20 mg/cm².

The <<sandwich>> configuration applies both to <<thin>> joints i.e. having a thickness of less than 500 micrometers, and to <<thick>> joints i.e. having a thickness of 500 micrometers or more.

Figure 2:
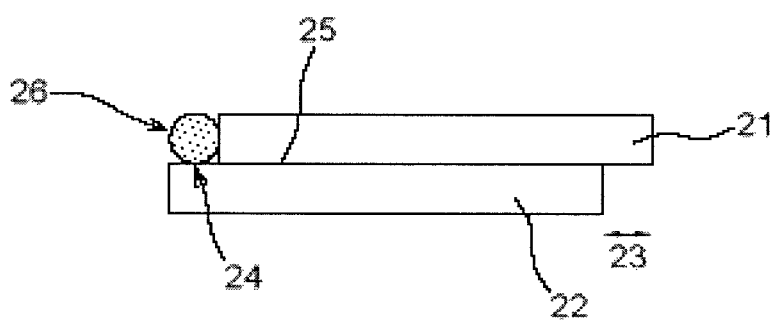
FIG. 2 is a schematic view showing the arrangement of the plates of SiC-based material and of the paste of brazing composition for brazing in capillary configuration.

Or else, as is illustrated in FIG. 2, the parts to be joined, for example in the form of blocks (21, 22), are placed in contact without having deposited the brazing composition between them but by leaving a gap, an offset (23) therebetween generally of a few mm, for example of 1 mm, 2 mm, to 10 mm so as to create a free surface (24) able to receive the suspension or paste in the vicinity of the joint (25) formed by the surfaces to be joined of the parts to be assembled, joined, then the suspension or paste of brazing composition is deposited for example in the form of a bead of braze alloy (26) on this surface in the vicinity of the joint or on the edge of the joint. During the brazing heat cycle, the liquid brazing composition infiltrates into the joint.

This brazing configuration is called a <<capillary configuration>>. With the brazing compositions of the invention it is possible to conduct said capillary brazing, with infiltration of the liquid braze alloy into the brazed joint during the brazing cycle, without depositing the brazing composition directly between the parts to be assembled as in the <<sandwich>> configuration.

This capillary configuration is even preferred for the Ni—Si system since it allows better filling of the joint to be obtained with the braze alloy.

The quantity of paste, suspension of brazing composition to be used in this capillary configuration is generally 10 mg/cm² to 40 mg/cm², for example 20 mg/cm².

Capillary brazing is possible with the Ni—Si system for <<thin>> joints having a thickness of less than 500 μm without the need for the prior placing of reinforcements in the joint. Capillary brazing led to good filling of the joints by the Ni—Si braze alloy, the joint thickness possibly varying from a few microns to almost 500 μm for parts in SiC/SiC composite having surface defects.

The parts ready to be brazed are then arranged in a heating device such as a furnace, or subjected to heating using any other suitable means.

The furnace is generally a graphite furnace or metal furnace, in a vacuum or neutral gas atmosphere.

In general the vacuum is a high vacuum i.e. the pressure is $10^{-3}$ to $10^{-5}$ Pa, for example $10^{-4}$ Pa.

Preferably, the neutral gas is argon.

With the invention it is even possible to use argon of commercial quality (generally having 5 ppm $O_2$).

The parts to be joined are subjected to a heat cycle, in the furnace for example.

Therefore the assembly formed by the parts and the brazing composition may be brought to the brazing temperature by observing a preferably <<slow>> temperature rise, with one or more temperature ramps from ambient temperature.

This temperature rise may be obtained for example using a temperature ramp of 1° C. to 5° C./minute.

The brazing plateau is generally conducted at a temperature, which is the brazing temperature, that is preferably at least 15°, more preferably at least 30° C. higher than the melting point or liquidus temperature of the chosen brazing composition, braze alloy.

For the brazing of porous surfaces to be brazed, for example for composite materials whose SiC surface coating is insufficiently thick, it may be useful to conduct brazing at a temperature between the liquidus and the solidus of the brazing composition in order to obtain a braze alloy in the semi-solid state during the brazing temperature plateau. The braze alloy is then viscous and infiltration thereof into the porosities can be better controlled.

The brazing temperature is generally from 1020° C. to 1150° C., preferably 1080° C. to 1100° C., depending on the brazing composition and the relative proportions of Ni and Si in this composition.

Depending on the compositions, the liquidus temperature generally varies from 1005° C. to 1125° C. and the brazing temperature will therefore vary for example as specified above from 1020° C. to 1150° C.

The temperature of 1020° C. has been given for the lowest brazing temperature point since the method is operational even with a difference of 15° C. between the melting point and the brazing temperature, but a difference of at least 30° C. is generally preferable for large-size parts, and the lowest brazing temperature is then 1055° C. Similarly, the highest brazing temperature can be 1150° C.

Said melting temperature of the compositions, according to another advantage of the method of the invention, allows the use of the assembly at up to 850° C. and even up to 880° C.

Surprisingly, although the brazing temperature of the brazing compositions according to the invention is lower than 1150° C., excellent adhesion and very good wetting of the silicon carbide are obtained with rapid wetting kinematics, as shown by the sessile drop test performed with these brazing compositions, and it is therefore possible (see Examples 1 and 2) to obtain a contact angle smaller than 40° after brazing for 30 minutes at 1100° C.

This excellent wetting is indispensable to achieve good quality of the formed joints, since it ensures good quality filling of the joint, but it does not always allow to guarantee a good mechanical behaviour since this latter property is unpredictable. Yet, surprisingly, the joints prepared with the brazing compositions of the invention also have excellent mechanical properties.

The above-defined brazing temperature of 1020° C. to 1150° C., preferably 1080° C. to 1100° C., is held for a time of 1 to 150 minutes, preferably 30 to 150 minutes, more preferably 60 to 120 minutes, most preferably 90 minutes to 120 minutes, this being called the brazing plateau.

For materials having relatively porous brazing surfaces such as composite materials whose SiC coating is insufficiently thick, it may be useful to reduce the usual brazing time which is generally from 30 to 150 minutes, to a time of a few minutes namely a time of between 1 and 30 minutes for example, to prevent too much infiltration of the brazing composition into the porosities of the material to the detriment of filling of the joint.

In this case, it is also to be noted that the lowest brazing temperatures are generally recommended to limit infiltration, namely generally between 1000° C. or 1020° C. and 1080° C.

The duration of the brazing plateau is dependent on the size of the parts to be joined and more specifically on the size of the surfaces to be brazed. It is effectively possible for this duration to reach 150 minutes for very large parts having large surfaces areas to be brazed, namely typically at least 50×50 mm².

A brazing plateau for the method of the invention may for example be conducted at a brazing temperature of 1100° C. for 60 to 90 minutes.

The specific temperature of the chosen brazing plateau is a function of the composition of the braze alloy.

A homogenizing plateau at 900° C. for example is recommended even indispensable for large-size parts (typically on and after 50×50 mm²) to guarantee the thermal homogeneity at the parts to be joined.

It is to be noted that since the wetting kinetics are already good, it is not necessary to accelerate the already excellent wetting, and this first temperature plateau in the case of the Ni—Si compositions of the invention is essentially even solely a homogenization plateau.

This plateau can be replaced by a slow temperature rise for example around 900° C.

The duration of the first plateau and the length of the brazing plateau are dependent on the size of the furnace, the size of the parts to be brazed and the tooling supporting the parts to be brazed.

This fist plateau which is therefore a homogenization plateau is generally observed at a temperature of 850° C. to 910° C., for example 900° C. for a minimum recommended time, duration, of one hour, for example a time of 60 to 180 minutes, before conducting the actual brazing plateau under the conditions already indicated above.

Both in the capillary configuration and in the <<sandwich>> configuration, the said first plateau is not indispensable for parts of small size. The said first plateau is generally recommended even indispensable in both these configurations for large-size parts, namely and in general parts which have surfaces to be brazed of more than 50×50 mm², to guarantee thermal homogeneity at the parts to be joined.

The duration of these temperature plateaus may be increased, and for example may be set at 180 minutes for the first plateau and 150 minutes for the second plateau for parts of very large size for example having a surface area of 0.5 m² or more to be brazed.

Or else thermal homogenization may be also be obtained by omitting this first plateau and conducting a slow temperature rise (at the rate of 0.5° C./minute for example) generally between 850° C. and 910° C., for example at around 900° C., so that the exposure time of the assembly in this temperature range is for example of the order of 60 to 180 minutes.

Like the first plateau, the said slow temperature rise is advisable even indispensable for large-size parts in both configurations.

On completion of the brazing cycle, after the brazing plateau, the assembly is cooled down to ambient temperature at a rate of 5° C. or 6° C. per minute for example.

During cool-down, the braze alloy solidifies and the joining of the parts made of silicon carbide-based materials becomes effective whether a <<sandwich>> configuration is used or a <<capillary>> configuration.

The assemblies formed with the method of the invention were subjected to compression/shear tests (see FIG. 4) at ambient temperature.

For sintered SiC/NiSi braze alloy of the invention without reinforcement/sintered SiC joints, the breaking stress values obtained were 26 MPa and 90 MPa which is an excellent result much higher than those obtained in document [3] with a NiSi braze alloy containing 65 mass % Nickel and 35 mass % silicon.

For joints between substrates made of CMC composite of Cerasep A40C® type (SiC matrix, SiC fibres)/NiSi braze alloy of the invention without reinforcement/CMC composite, the breaking stress values obtained were of the order of 13 MPa, the weak point of the assembly between the braze alloy and the CMC being located at the CMC coating which is SiC prepared by chemical vapour deposition (CVD).

The assemblies of parts made of silicon carbide comprising joints prepared using the method of the invention allow to obtain structures, apparatus, components of complex shapes having high temperatures of use which may reach 850° C., even 880° C., with great precision.

It is effectively known that the properties of silicon carbide:
high hardness;
high rigidity;
low density;
low coefficient of expansion;
high breaking strength;
good resistance to heat shock;
and very good conductivity makes this material an indispensable material for present and future industrial applications, in particular at high temperature.

In addition, SiC has very good chemical resistance to various acids including hydrofluoric acid, and very good resistance to oxidation in air at high temperature of up to 1300° C.

In other words, the method of the invention can notably be applied to the manufacture of any device, apparatus, structure, component requiring moderately refractory joining, assembling, between at least two substrates, parts in silicon carbide, by guaranteeing both good mechanical strength and a satisfactory sealing, leak tightness, at the joint.

This type of device, apparatus, structure, component is able to meet the needs in various fields:
the field of heat engineering, in particular for the designing of high performing heat exchangers since silicon carbide has good thermal conductivity and good resistance to high temperatures in extreme environments;
the field of mechanical engineering, to manufacture on-board devices to obtain light weight, rigid, refractory components resisting to abrasion and mechanical stresses;
the field of chemical engineering, since silicon carbide is resistant to numerous corrosive chemical products such as bases and strong acids;
the field of nuclear engineering, for the manufacturing of cladding for nuclear fuel;
the fields of spatial optics (telescope mirror made of SiC) and aeronautics (parts made of SiC/SiC composite);
power electronics which use SiC substrates.

The invention will now be described using the following examples evidently given as non-limiting illustrations.

EXAMPLES

Example 1

This example describes sessile drop tests performed with a brazing composition, braze alloy of the invention of composition containing 64% Si, 36% Ni in atomic percentages, i.e. 46% Si and 54% Ni by mass on sintered pure α-SiC observing a single brazing plateau at 1100° C.

a) Preparation of the Brazing Composition and Brazing Paste

The targeted brazing composition of 64 atomic % Si and 36 atomic % Ni was prepared from pieces of pure Si and pure Ni.

These pieces were weighed paying heed to the proportions of the brazing composition and placed in an alumina crucible. The assembly was placed in a metal furnace and subjected to a heat cycle with a plateau at 1250° C. under argon for 120 minutes.

After cooling, this gave an ingot. This ingot was crushed to obtain a powder.

An organic binder (NICROBRAZ® cement) was added to this mixture of powders to form a viscous paste.

b) Sessile Drop Test at 1100° C.

The brazing paste thus prepared was used to form a small mound of braze alloy of mass approximately 50 mg. This mound of braze alloy was deposited on a previously cleaned SiC plate.

The assembly of the braze alloy mound and plate was placed in a brazing furnace, in this case a metal furnace, and subjected to a brazing heat cycle under a high vacuum with only a single plateau which was the brazing plateau at 1100° C.

The mound of braze alloy melts during this heat treatment and forms a drop that is called a sessile drop.

A viewing window allows the spreading of the drop to be monitored in situ.

The wetting, contact, angle of the drop was measured on the liquid drop in situ through the viewing window.

The wetting angle was of the order of 60° after 5 minutes, of the order of 50° after 20 minutes and less than 40° after 30 minutes of hold time, which corresponds to good wetting.

The SiC and its drop of solidified braze alloy were then cross-sectioned, coated and polished and observed under scanning electron microscope.

The SiC/braze alloy interface did not show any reactivity on the scale of scanning electron microscopy i.e. there was no formation of a new compound. In particular, there was no formation of fragile compounds at the interface.

Example 2

This example describes sessile drop tests performed with a brazing composition, braze alloy of the invention having the composition 64% Si, 36% Ni, in atomic percentages, i.e. 46% Si and 54% Ni % by mass on a Cerasep A40C® SiC/SiC composite, observing a single brazing plateau at 1100° C.

a) Preparation of the Brazing Composition and Brazing Paste

The brazing composition concerned, 64 atomic % Si and 36 atomic % Ni, was prepared as indicated in Example 1.

A paste of brazing composition was formed as in Example 1.

b) Sessile Drop Test at 1100° C.

The brazing paste prepared was used to form a small mound of braze alloy of mass in the order of 50 mg. This mound of braze alloy was deposited on a plate of SiC/SiC composite with SiC matrix and SiC fibres. This composite is available from Snecma Propulsion Solide under the trade name CERASEP A40C®. The plate was previously cleaned before depositing the braze alloy.

The assembly of the mound of braze alloy and plate was placed in a brazing furnace, here a metal furnace, and subjected to a brazing heat cycle under a high vacuum with a single plateau, which was the brazing plateau at 1100° C. for 60 minutes.

The mound of braze alloy melts during this heat treatment and forms a so-called sessile drop.

A viewing window allows in situ monitoring of spreading of the drop.

The wetting, contact, angle of the drop was measured on the liquid drop in situ through the window.

The wetting angle was of the order of 40° after a hold time of 5 minutes, 30° after a hold time of 30 minutes, and less than 20° after a hold time of 60 minutes which corresponds to good wetting.

The composite and its drop of solidified braze alloy were then cross-sectioned, coated and polished and observed under scanning electron microscopy.

The CMC/braze alloy interface did not show any reactivity on the scale of scanning electron microscopy i.e. there was no formation of a new compound. In particular there was no formation of fragile compounds at the interface.

Example 3

This example describes the preparation of bonds, joining between two parts made of sintered pure α-SiC using the brazing method according to the invention, the brazing being conducted in capillary configuration using a brazing composition, braze alloy of the invention composed of 64% Si, 36% Ni in atomic % i.e. 46% Si and 54% Ni by mass. This example also describes tests, mechanical tests performed on these assemblies.

a) Preparation of the Brazing Composition, of the Brazing Paste and of the Parts to be Assembled, Joined The targeted brazing composition, namely 64 atomic % Si and 36 atomic % Ni, was prepared in the manner described in Example 1.

A paste of brazing composition was formed as in Example 1.

The parts in sintered SiC to be assembled were plates of size 20×10 mm² and thickness of 1.5 mm.

The parts were cleaned with acetone then ethanol and finally dried.

The substrates, parts were placed in contact leaving a small offset of 1 to 2 mm, so as to leave a space for depositing the brazing paste in the vicinity of the joint (this configuration is called the capillary configuration). The paste was deposited with a spatula on the available surface at the edge of the joint, in the form of a bead of braze alloy (see FIG. 2). The quantity of deposited braze alloy was between 20 and 30 mg for this assembly.

b) Brazing

The contacted parts ready to be brazed were placed in a brazing furnace (metal furnace in this case) under a high vacuum and subjected to a brazing heat cycle under a vacuum which comprises a single temperature plateau of 60 minutes at 1100° C., which was the brazing plateau.

Figure 3:
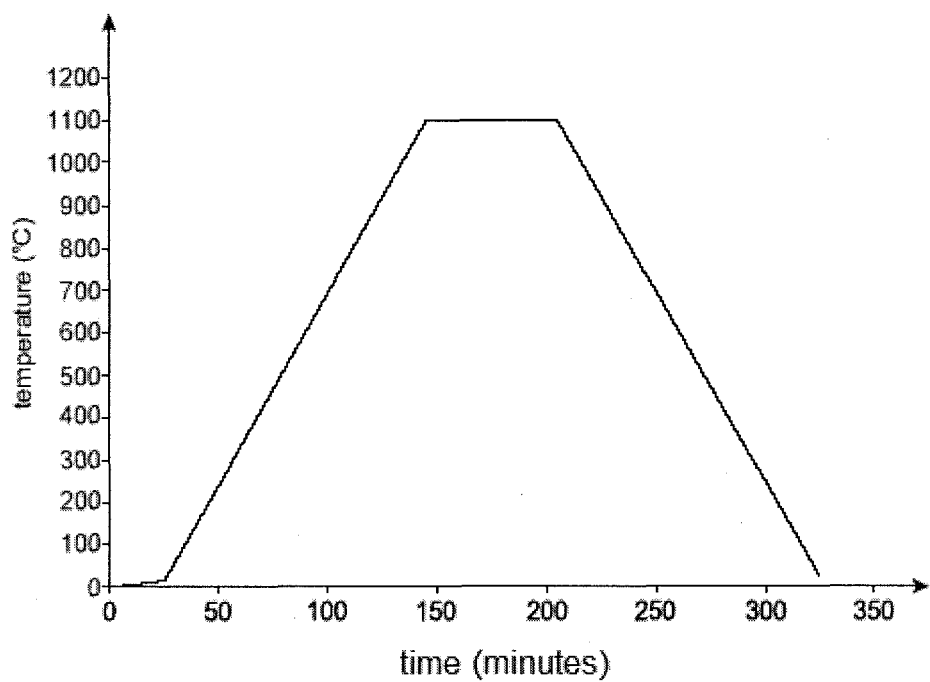
FIG. 3 is a graph illustrating the brazing heat cycle used in Examples 3 and 4. The time in minutes as from the start of heat treatment is given along the X-axis, and the temperature T in ° C. is given along the Y-axis.

The heat cycle is illustrated in FIG. 3.

c) Observation of the Joint

After cooling, the assembly was well joined. The joint was characterized by scanning electron microscopy. There was no <<void>> and no reactivity between the SiC and the braze alloy was evidenced on the scale of observation under scanning electron microscopy.

d) Preparation of Mechanical Test Pieces and Results of Mechanical Tests

Assemblies, test pieces (2 test pieces) for mechanical testing were prepared by brazing 2 parts each of size 20×10×1.5 mm³ (the thickness of the brazed test piece was therefore 1.5+1.5=3 mm) (41, 42) with the brazing paste prepared at a) above and under the brazing conditions described at b) above. Since the mechanics of ceramics are statistical, more than one test piece was prepared for testing but following the same method of fabrication.

Figure 4:
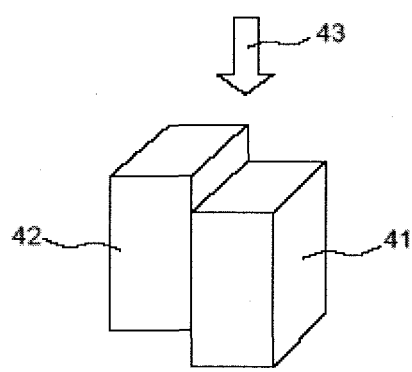
FIG. 4 is a schematic view of the test pieces used for mechanical testing, in particular compression/shear testing of the joints and the assemblies prepared in Examples 3 and 4.

The test pieces are schematized in FIG. 4. They were held on a mount and subjected to shearing during a compression/shear test (43) at ambient temperature.

It is to be noted that this test does not allow to guarantee pure shear but it is the preferred mode. However this test does allow a comparison between the assemblies.

Results of the Mechanical Tests

The breaking stresses determined for each of the two test pieces were 26 MPa and 90 MPa.

Breakings occurred in the SiC, which is characteristic of strong bonds between the braze alloy and the substrate made of SiC.

It is to be noted that the breaking stress values of joins, assemblies of the type SiC/braze alloy with high Si content/SiC can be more or less dispersed on account of the fragile nature of ceramic materials.

Example 4

This example describes the preparation of bonds, joining, assemblies, between two parts made of CMC, more specifically made of SiC/SiC composite with a SiC matrix and SiC fibres, using the brazing method of the invention, the brazing being conducted in capillary configuration using a brazing composition, braze alloy of the invention composed of 64% Si, 36% Ni in atomic % i.e. 46% Si and 54% Ni by mass. This example also describes mechanical tests performed on these assemblies.

a) Preparation of the Brazing Composition, of the Brazing Paste and of the Parts to be Joined, Assembled The brazing composition concerned, namely 64 atomic % Si and 36 atomic % Ni, was prepared in the manner described in Example 1.

A paste of brazing composition was formed as in Example 1.

The parts, substrates to be brazed, joined, assembled, were plates of SiC/SiC composite with a SiC matrix and SiC fibres. The said composite material is available from Snecma Propulsion Solide under the trade name Cerasep A40C®. These plates were of size 20×10 mm$^2$ and of thickness 1.5 mm.

The parts were cleaned with acetone then ethanol and finally dried.

The substrates, parts were placed in contact leaving a small offset of 3 mm, so as to leave a space for depositing the brazing paste in the vicinity of the joint (this configuration is called the capillary configuration). The paste was deposited with a spatula on the free, available, surface at the edge of the joint, in the form of a bead of braze alloy (see FIG. 2), as described in Example 3. The quantity of deposited braze alloy was between 180 and 220 mg for this assembly.

This quantity of paste is much higher than in Example 3 since the clearance between the plates made of CMC was much greater than for the plates of sintered SiC in Example 3.

For example the thickness of the joint may reach 500 µm for the CMC plates on account of the planarity defects, whereas it is generally less than 100 µm for the SiC plates.

b) Brazing

The parts placed in contact and ready to be brazed were placed in a brazing furnace under a high vacuum and subjected to a vacuum brazing heat cycle which comprised a single plateau for 60 to 90 minutes at 1100° C., which was the brazing plateau.

The heat cycle is illustrated in FIG. 3.

Brazing was conducted either in a metal furnace with a plateau of 60 minutes at 1100° C., or in a graphite furnace with a 90-minute temperature plateau.

c) Observation of the Joint

After cooling, the assembly was well joined. The joint was characterized under scanning electron microscopy. There was no <<void>>, and no reactivity between the SiC and the braze alloy was evidenced on the scale of observation under scanning electron microscopy.

The thickness of the joint was between 100 and 500 µm depending on the observed zones owing to local coating defects of the CMC and planarity defects.

d) Preparation of Mechanical Test Pieces and Results of Mechanical Tests

Assemblies, test pieces (3 test pieces) for mechanical testing were prepared by brazing 2 parts each of size 20×10×1.5 mm$^3$ with the brazing paste prepared at a) above and under the brazing conditions described at b) above.

Two assemblies were brazed in a metal furnace with a plateau of 60 minutes at 1100° C.

One assembly was brazed in a graphite furnace with a plateau of 90 minutes at 1100° C.

The test pieces were of similar size to those in Example 3 and were similarly tested under compression/shear.

Results of the Mechanical Tests:

The breaking stresses determined for each of the 3 test pieces were 11 MPa; 12 MPa; and 13 MPa.

For one test piece, breaking occurred by detachment of the SiC coating from the CMC. This coating therefore proves to be the weak point of the CMC/braze alloy/CMC assembly.

For the two other test pieces, the measured stress corresponded to the onset of degradation of the composite.

REFERENCES

[1] Gasse A., Coing-Boyat G., Bourgeois G., "Method using a thick joint for joining parts in SiC-based materials by refractory brazing and refractory thick joint thus obtained", U.S. Pat. No. 5,975,407, 1999.

[2] Gasse A., "Method for assembling parts made of materials based on SiC by non-reactive refractory brazing, brazing composition, and joint and assembly obtained by said method", Patent application US-A1-2003/0038166.

[3] Heap H., "Method of Brazing", U.S. Pat. No. 3,813,759, 1974.

[4] S. Kalogeropoulou, L. Baud, N. Eustathopoulos, "*Relationship between wettability and reactivity*", Acta. Metall. Mater, Vol. 43, No. 3, pp. 907-912, 1995.

[5] C. Rado, S. Kalogeropoulou, N. Eustathopoulos, "*Wetting and bonding of Ni—Si alloys on silicon carbide*", Acta. Metall. Mater, Vol. 47, No. 2, pp. 461-473, 1999.

[6] J. R. Mc Dermid, R. A. L. Drew., "*Thermodynamic brazing alloy design for joining silicon carbide*", J. Am. Ceram. Soc., Vol. 74, No. 8, pp. 1855-1860, 1991.

[7] Montgomery F. C., Streckert H. H., Braze for Silicon Carbide bodies, U.S. Pat. No. 5,447,683, 1995.

What is claimed is:

1. A method for joining, assembling, at least two parts comprising silicon carbide-based materials by non-reactive brazing, the method comprising:

contacting the parts with a non-reactive brazing composition;

heating an assembly formed by the parts and the non-reactive brazing composition to a brazing temperature sufficient to melt the brazing composition totally or at least partly; and cooling the parts and the brazing composition so that, after solidification of the brazing composition, a moderately refractory joint is formed;

wherein the non-reactive brazing composition is a binary alloy consisting, in atomic percentages, of 60% to 66% silicon and 34 to 40% nickel.

2. The method according to claim 1, wherein the brazing temperature is equal to or lower than 1150° C.

3. The method according to claim 1, wherein the said brazing composition is a binary alloy consisting, in atomic percentages, of 63 to 65% silicon and 35 to 37% nickel.

4. The method according to claim 1, wherein the said brazing composition is a binary alloy consisting, in atomic percentages, of 64% silicon and 36% nickel.

5. The method according to claim 1, wherein a powder of brazing composition is formed, this powder is placed in suspension in an organic binder to obtain a suspension or paste of brazing composition, and the suspension or paste of brazing composition obtained is deposited on at least one surface of at least one of the parts to be joined, assembled.

6. The method according to claim 5, wherein at least one surface to be joined, assembled, of at least one of the parts to be assembled, joined, is coated with the suspension or paste of brazing composition, the surfaces to be joined, assembled, of the parts are placed in contact so that the suspension or paste of brazing composition is inserted therebetween.

7. The method according to claim 5, wherein the surfaces to be joined, assembled, of the parts to be assembled, joined, are placed in contact leaving an offset between them so as to create a free surface able to receive the suspension or paste of brazing composition in the vicinity of the joint formed by the surfaces to be joined, assembled, of the parts to be assembled, joined, then the suspension or paste of brazing composition is deposited on this free surface.

8. The method according to claim 1, wherein brazing is conducted at a brazing temperature at least 15° C. higher than a melting point of the brazing composition.

9. The method according to claim 1, wherein brazing is conducted observing a brazing plateau at a brazing temperature of 1020° C. to 1150° C. held for a time of 1 to 150 minutes.

10. The method according to claim 9 wherein at least one surface to be joined of the parts to be assembled is porous and a brazing plateau is observed at a temperature of 1020° C. to 1080° C. for a time of 1 to 30 minutes.

11. The method according to claim 9, wherein, prior to the brazing plateau, a first plateau is observed at a temperature of 850° C. to 910° C. held for a time of 30 to 180 minutes.

12. The method according to claim 1, wherein the silicon carbide-based materials are selected from the group consisting of pure silicon carbides and composite SiC-based materials.

13. The method according to claim 1, wherein the silicon carbide-based materials are selected from the group consisting of sintered pressureless silicon carbide ("PLS-SiC"), Si infiltrated silicon carbide ("SiSiC" or "RBSC"), porous recrystallized silicon carbide ("RSiC"), graphite silicon ("C-SiC") composed of graphite coated with a SiC layer, SiC/SiC composites, SiC/SiC composites with self-healing matrix, C/SiC composites, SiC monocrystals, and SiC composites with another ceramic.

14. The method according to claim 1, wherein the said silicon carbide-based materials comprise a silicon carbide content of at least 50% by mass.

* * * * *